No. 636,673. Patented Nov. 7, 1899.
R. KLATT.
WRENCH.
(Application filed Aug. 26, 1899.)
(No Model.)
FIG.3. FIG.1. FIG.2.
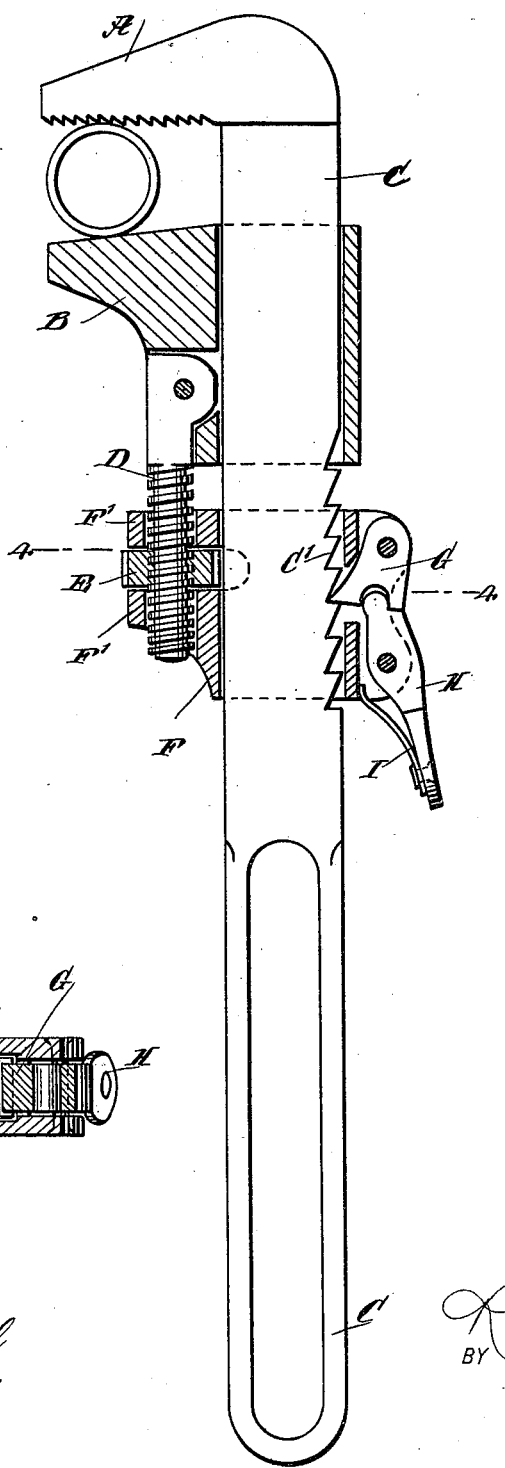
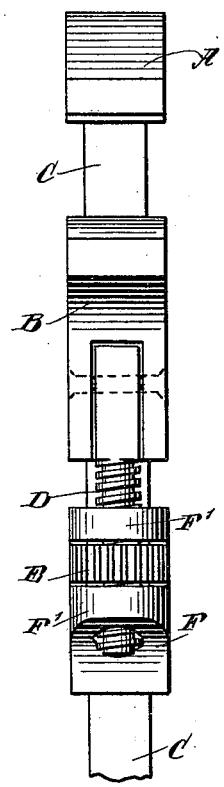
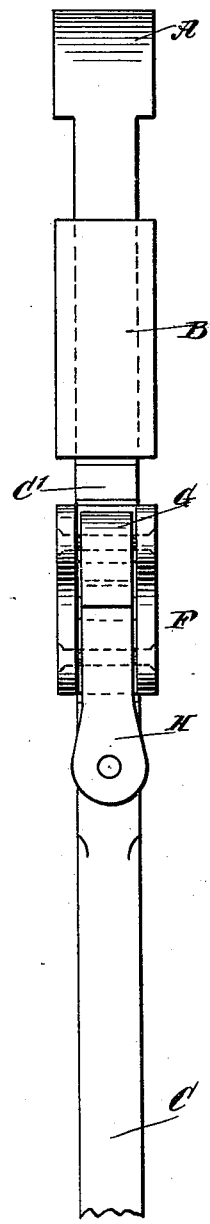
FIG.4.
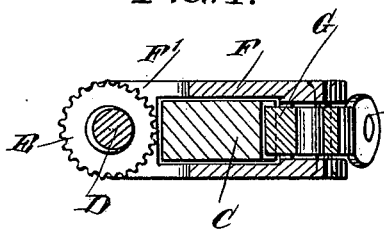
WITNESSES:
Donn Twitchell
Thos. G. Hosler
INVENTOR
R. Klatt
BY
Munn
ATTORNEYS

UNITED STATES PATENT OFFICE.

REINHOLD KLATT, OF STRONG CITY, KANSAS, ASSIGNOR OF ONE-HALF TO THOMAS M. BRODERICK, OF SAME PLACE.

WRENCH.

SPECIFICATION forming part of Letters Patent No. 636,673, dated November 7, 1899.

Application filed August 26, 1899. Serial No. 728,563. (No model.)

*To all whom it may concern:*

Be it known that I, REINHOLD KLATT, of Strong City, in the county of Chase and State of Kansas, have invented a new and Improved Wrench, of which the following is a full, clear, and exact description.

The invention relates to wrenches having a fixed and a slidable jaw; and its object is to provide a new and improved wrench designed for use on pipes, nuts, and other objects and arranged to permit, first, of a quick primary adjustment of the slidable jaw, and then an immediate final adjustment thereof to securely and firmly engage the object.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a sectional side elevation of the improvement. Fig. 2 is a back edge view of the same. Fig. 3 is a front edge view of the same, and Fig. 4 is a sectional plan view of the same on the line 4 4 in Fig. 1.

The improved wrench is provided with a fixed jaw A and a movable jaw B, fitted to slide on a shank or handle C, carrying the fixed jaw A. On the working side of the movable jaw B is pivoted a screw-rod D, on which screws a nut E, mounted to turn between, but held against longitudinal movement on, the shoulders F' of a locking-sleeve F, fitted to slide on the shank or handle C adjacent to the movable jaw B. On the back edge of the shank C are formed teeth C', adapted to be engaged by a locking-dog G, fulcrumed on the sleeve F and engaged by a lever H, likewise fulcrumed on the sleeve F and pressed on by a spring I, so as to normally hold the said lever and the dog G in the position shown in Fig. 1, the dog engaging one of the teeth C', so as to prevent outward movement of the sleeve F and the movable jaw B, connected by the screw-rod D and the nut E.

In order to use the wrench, the operator presses the lever H to throw the dog G out of engagement with the corresponding tooth C' on the shank C to permit of sliding the sleeve F, and with it the movable jaw B, to make a primary adjustment—that is, to bring the jaw B close to the object engaging the toothed inner face of the fixed jaw A. When this position of the movable jaw has been reached, the operator releases the lever H, so that the dog G engages a corresponding tooth C' on the shank and locks the sleeve F and the jaw B against outward sliding movement on the shank C. A final immediate adjustment of the slidable jaw B is now made by the operator turning the nut E so as to cause the bolt screw-rod D, and with it the jaw B, to move toward the object, as the outward movement of the sleeve F is prevented by the dog G engaging one of the teeth C'. Thus the movable jaw B is brought in firm engagement with the object under treatment.

When the wrench is used in the usual manner to turn the object, the strain on the inclined working face of the movable jaw B causes a slight tilting thereof on the shank C, whereby the pivot for the screw-rod D is relieved of undue strain, the principal strain falling solely on the fixed jaw A, the movable jaw B, and the shank C, and consequently the sleeve F and the parts thereof are not subjected to undue wear.

In releasing the object the operator first turns the nut E, so as to move the jaw B from the object, and then the operator presses the lever H to swing the dog G out of engagement with the teeth C', to permit of moving the slide F, with the jaw B, outward on the shank C for completely releasing the object.

Having thus fully described my invention, I claim as new and desire to secure by Letters Patent—

1. A wrench, comprising a shank having a fixed jaw, a movable jaw fitted on said shank, a locking-slide fitted on said shank and having a longitudinal opening in its front face and a transverse opening leading thereinto, a screw-rod pivotally connected with the movable jaw and loosely inserted through the longitudinal opening in the locking-slide, a nut screwing on said screw-rod and fitted in the transverse opening in the slide, a locking-dog pivoted around a fixed axis on the rear of the locking-slide and having a lockingtooth on its free end, and a spring-pressed lever fulcrumed on the locking-slide and engaging said dog to operate the same, as and for the purpose set forth.

2. In a wrench, the combination with a shank having teeth along its rear edge and a fixed jaw, a movable jaw fitted thereon, and a screw-rod pivotally connected to said movable jaw, of a locking-slide separate from said movable jaw and surrounding said shank, said slide having a longitudinal opening in which said rod is loosely received and spaced-apart shoulders, a nut held between said shoulders and screwing on said rod, a locking-dog pivoted on a fixed axis on the rear of said slide and having a tooth adapted for engagement with the teeth on the shank, and a spring-pressed lever pivoted on said slide and engaging said dog to operate the same, as and for the purpose set forth.

REINHOLD KLATT.

Witnesses:
R. M. RYAN,
FRANCES POWERS.